United States Patent [19]

Deakyne

[11] Patent Number: 5,232,975
[45] Date of Patent: Aug. 3, 1993

[54] PRECONSOLIDATION PROCESS FOR MAKING FLUOROPOLYMER COMPOSITES

[75] Inventor: Clifford K. Deakyne, Wilmington, Del.

[73] Assignee: E. I. Du Pont de Nemours and Company, Wilmington, Del.

[21] Appl. No.: 821,568

[22] Filed: Jan. 16, 1992

[51] Int. Cl.$^5$ .......................... C08K 3/04; B29C 43/00
[52] U.S. Cl. ..................................... 524/495; 524/496; 524/545; 524/546; 523/220; 523/307; 264/108; 264/321
[58] Field of Search ................. 523/220, 307; 524/495, 524/496, 545, 546; 264/108, 321

[56] References Cited

U.S. PATENT DOCUMENTS

| | | | |
|---|---|---|---|
| 4,163,742 | 8/1979 | Mansure | 523/220 |
| 4,824,898 | 4/1989 | Sukigara et al. | 524/496 |
| 4,927,581 | 5/1990 | Medwin | 264/108 |
| 5,061,423 | 10/1991 | Layden | 264/108 |

Primary Examiner—Paul R. Michl
Assistant Examiner—LaVonda R. DeWitt

[57] ABSTRACT

A process for preconsolidating a planar porous fiber-thermoplastic resin layer which is unconstrained in the inplane directions by heating the layer to above the melting point of the resin, then applying pressure to the plane of the layer causing resin flow, thus orienting the fibers in the plane of the layer.

3 Claims, 1 Drawing Sheet

PRECONSOLIDATION PROCESS FOR MAKING FLUOROPOLYMER COMPOSITES

BACKGROUND OF THE INVENTION

Field of the Invention

A process for the production of composites containing reinforcing fiber and a fluoropolymer.

Polymeric composites consisting of a matrix resin (including fluoropolymers) and a reinforcing fiber is an area well known in the art. By adding the fiber to the matrix resin, certain properties of the resin alone are often improved. These properties can include creep, tensile strength and modulus, flexural strength and modulus. Generally speaking, the reinforcing fiber chosen has a higher tensile modulus and strength than the polymer alone. When a fluoropolymer is used as the matrix resin, as described herein, the resulting composite often has many of the attributes of fluoropolymers such as high temperature resistance and chemical resistance, which make such composites useful in part, for example, for the chemical processing industry and semiconductor industry. It is the object of this invention to provide a method for the production of such fluoropolymer composites that exhibit improved properties.

U.S. Pat. No. 4,163,742, which is incorporated herein by reference, describes a process for making tetrafluoroethylene copolymer-graphite fiber composite by mixing the polymer and fiber together in a slurry and then removing the water to obtain an intimate mix of fiber and polymer. It is also known that fluoropolymers have very low surface energy and are difficult to wet in an aqueous media for mixing, as well as wet the reinforcing fiber in the molten state to form a composite. Thus, very fine particles are used to enhance the intimacy of the fiber resin mixture. This complicates mixing by requiring extensive use of organic solvents or emulsifying agents to assist wetting. Further, this complicates consolidation by creating a mix with a very high bulk factor with dry mix typically being ten times the volume of a consolidated composite.

As taught in U.S. Pat. No. 4,163,742, pressing the mix at 5000 to 6000 psi was required to cold compact it, allowing a stepwise filling of the mold. In this step the mix is debulked as air is removed; the resin cold flows to form a stable block. Subsequent heating coalesces the block into a solid. This technique is common with Teflon ® materials. Further, experience showed that heating the resin fiber mix in a mold without cold compaction caused the resin to flow and leak from the mold before enough pressure was built up to remove the air and consolidate the block. However, cold compaction causes significant fiber breakage and requires deep draft molds and very high pressures. It is highly desirable to find a method for producing consolidated composites of intimately co-dispersed, finely divided fluoropolymer and other thermoplastic resins with reinforcing fibers without the need to severely damage the reinforcement in the process.

SUMMARY OF THE INVENTION

This invention involves a process for the production of a fluoropolymer-fiber composite, comprising: producing a planar preform of an intimate mixture of fluoropolymer and fiber by any number of means, removing any water, solvent, surfactant, etc. by conventional means, preconsolidating said mixture by heating said mixture above the fluoropolymer melt temperature, then applying sufficient pressure normal to the plane of said mixture while the mixture is unconstrained in the in-plane direction to cause the fluoropolymer to flow; orienting said fibers substantially in the plane of the preform layer by means of said polymer flow to form a preconsolidated sheet, and cooling said sheet under pressure. This invention involves the use of a "fluoropolymer" as the matrix resin in a polymer-fiber composite. By fluoropolymer is meant an organic polymer that contains at least 10% fluorine by weight, preferably at least about 45% by weight, and it is especially preferred if the polymer is perfluorinated, i.e., contains essentially no hydrogen or halogen other than fluorine bound to carbon.

The fibrous material used in the instant process may be any variety of fibers usually used for such purposes. Of course, the fiber must be stable under the process conditions, not decomposing oxidatively or thermally, or reacting with the fluoropolymer. Fibers often used for this purpose include, but are not limited to, glass, graphite (carbon), fluorinated graphite, aramid such as poly (p-phenyleneterephthtalamide), boron nitride, silicon carbide, polyester and polyamide. Graphite and fluorinated graphite are preferred fibers and fluorinated graphite is especially preferred.

The fiber may be in a variety of forms for the present process. Preferably, the fiber may simply be chopped fiber that is mixed with an aqueous dispersion.

As is well known to those skilled in the art, polymer-fiber composites with superior properties are produced when there is good wetting and adhesion between the polymer and the fiber. It is common in the art to use fibers that have been surface treated with materials to improve this adhesion, and the use of such treated fibers is contemplated herein. Such treated fibers are articles of commerce and individual manufacturers make recommendations as to which fiber (and treatment or coating) should be used with any particular polymer.

A route to achieving a highly homogeneous distribution of the fiber and the fluoropolymer is to slurry the two together in water as described in U.S. Pat. No. 4,163,742. This dried mix is then an open porous mix.

This porous mix is then preconsolidated by heating above the melt temperature of the fluoropolymer but below the melt temperature of the fibers, then applying sufficient pressure normal to the plane of the structure while the material is unconstrained in the in-plane directions to cause the fluoropolymer to flow and orient the fibers by means of the flow in the plane of the structure. The structure is cooled under pressure to form a solid consolidated sheet.

DETAILED DESCRIPTION OF THE PREFERRED EMBODIMENT

Figure 1A:
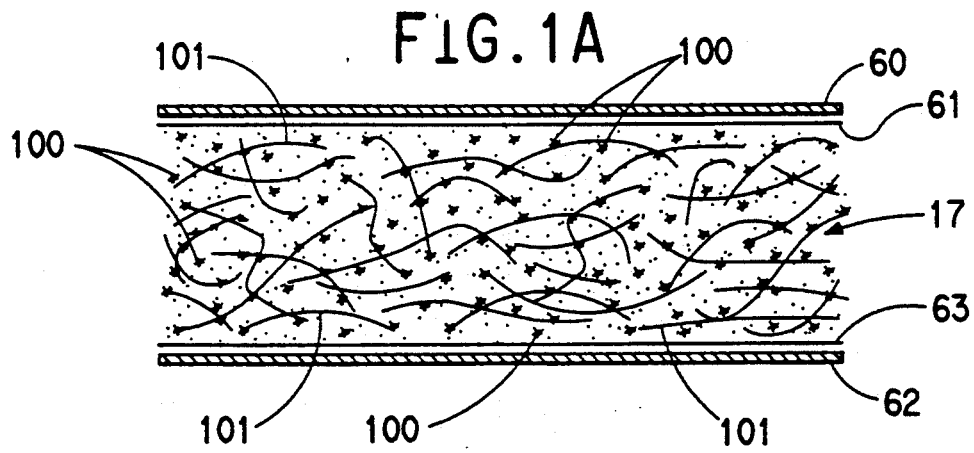
FIGS. 1A–D are schematic illustrations of the preconsolidation process.

An intermediate process prior to the molding of thick composite parts has been found to provide a product with enhanced strength. As best shown in FIGS. 1A–D, this process involves taking a fiber-resin layer 17 and placing it between two platens 60,62. Release films 61,63 are placed between platens 60,62 and the preform layer 17 composed of fibers 101 and fluoropolymer particles (102 (FIG. 1A), or the platens must otherwise be treated to prevent sticking of the consolidated layer.

Figure 1B:
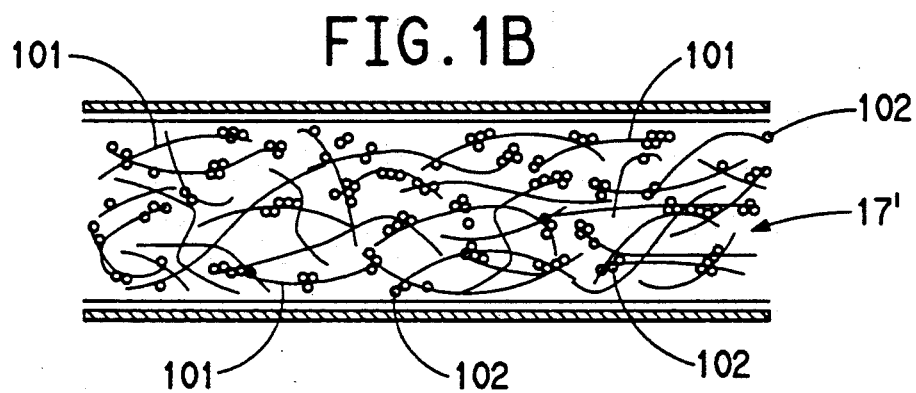
Figure 1C:
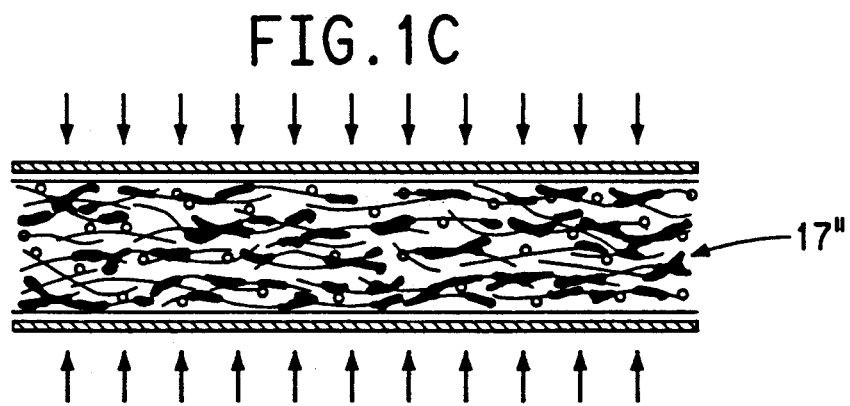
Figure 1D:
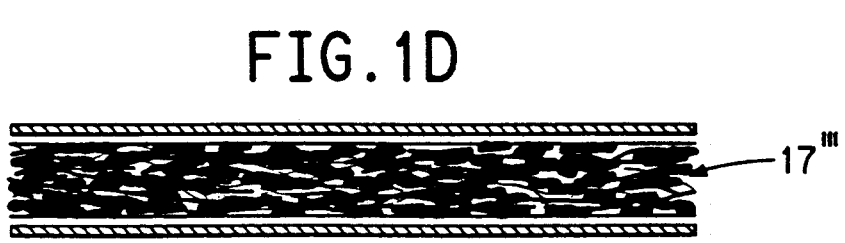

The layer 17 is initially under low contact pressure from the platens as heat is applied. The fluoropolymer changes to its molten state as the temperature exceeds the melting point and forms beads 102 on the fibers throughout the layer 17′(FIG. 1B). Pressure is then applied to platens 60,62 causing the molten fluoropolymer to flow in layer 17″(FIG. 1C), and since the mix is in an unconstrained state at the edges of the platens, i.e., in the in-plane directions, the fibers are moved along with the polymer giving them a planar arrangement of fibers coated with molten fluoropolymer in layer 17‴ (FIG. 1D). Since the mix is unconstrained in-plane, there are no compression forces on the plane and no buckling occurs. The preconsolidated sheet is then cooled under pressure. This same sequence of events can be achieved on a continuous basis using a heated belt press or similarly a heating zone and nip rolls. The process requires that the resin is heated above the melt, then pressure is applied causing flow, and the composite is cooled under pressure.

The preconsolidated sheet is then shaped into an article by subjecting the structure to heat and pressure for a sufficient amount of time to form it. The temperature, pressure and time required to do this will vary with such factors as the polymer, polymer viscosity, fiber configuration, and thickness. The polymer will usually be heated close to or above its glass transition or melting temperature, whichever is higher. It is possible to cause polymer flow below these temperatures, but it usually requires longer times and higher pressures. The pressure and time required is generally related to the polymer viscosity at the process temperature. The higher the viscosity, the higher the pressure and/or longer the time required. These factors are also affected by the fiber loading, with higher loadings generally requiring higher pressures and/or longer times. For any particular composition, these factors are readily determined by routine experimentation.

Pressure may be applied, for example while the structure is in a die in a compression press, or if a flat sheet is desired, between the (heated) platens of a compression press. Other types of suitable equipment will be apparent to the art skilled.

It is believed that the instant process yields composite articles superior to those of the prior art, particularly in regard to certain physical properties such as tensile strength. It is hypothesized that this occurs because of the substantially in-plane orientation of the fibers and increased fiber length.

In the following Examples, Teflon ® PFA is a registered trademark of and available from E. I. du Pont de Nemours and Company, Wilmington, DE, and is a polymer containing about 99 mole percent tetrafluoroethylene and 1 mole percent perfluoro(propyl vinyl ether). BASF Celion 6 ns is a graphite fiber available from BASF, Inc., Charlotte, SC.

EXAMPLE 1

The fiber/resin product according to U.S. Pat. No. 4,163,742 was made by adding 10.6 pounds of Teflon ® pFA 3740 powder by Du Pont to 15 pounds of acetone in a Littleford lab mixer. This was blended with 57 pounds of water, then 2.6 pounds of BASF Celion 6 ns 0.25 in carbon fiber was added. After mixing, the mix was filtered and the wet resin/fiber was dried in a Class A oven.

A test block was made according to the stepwise filling and cold compression method described in U.S. Pat. No. 4,163,742, then consolidated. A 7.5×7.5″ deep draft mold was loaded with fiber and pressed at 5000 psi, then reloaded and repressed until enough fiber was added for a 1″ final thickness. The mold with the cold compacted mass was then loaded into a press with a 660° F. platen temperature and held at 400 psi for 2 hours after the mold reached 650° F., then cooled under pressure until the mold was below 300° F.

A sheet was made according to the preconsolidation process of this invention by piling the resin/fiber in the center of a Kapton covered plate, then covering with another Kapton covered plate, then heating to 700° F. at contact pressure for 10 minutes, then pressing normal to the plane of the plate at 700 psi for 20 minutes while resin/fiber material is unconstrained in the in-plane direction and cooling under pressure. Another test block (0.8″ final thickness) was made by die cutting about 20 plies of the preconsolidated sheet material and molding in the same mold with the same hot molding cycle as above. Preconsolidation of PFA/carbon fiber combinations resulted in significant improvements in final part properties as shown in the table below:

TABLE

Comparison of Molding Processes Based on Final Test Block Properties (Mean Values)

|  | Via U.S. Pat. No. 4,163,742 | Preconsolidated Process |
|---|---|---|
| Compressive Strength (Ksi)** | (1) 22.0 | 29.0 |
| Flexural Strength* | (1) 17.0 | 19.8 |
| Flexural Modulus (Msi)* | (1) 1.3 | 1.9 |
| Compressive Strength | (2) 8.0 | 18.3 |
| Flexural Strength | (2) 16.0 | 22.1 |
| Flexural Modulus | (2) 1.2 | 1.8 |

*measured per ASTM D790 using ⅛″ thick × ½″ × 7½″ bars
**measured per ASTM C-365-57 using ½″ cubes

EXAMPLE 2

Fiber length distributions were measured for other samples made with the process described above. Lengths for the starting fiber, the process via U.S. Pat. No. 4,163,742 and from this process are compared below.

| Measured Fiber Length in cm | | |
|---|---|---|
| Unprocessed Fiber | Process Via U.S. Pat. No. 4,163,742 | Preconsolidation Process |
| 0.722 | 0.250 | 0.556 |
| 0.667 | 0.417 | 0.444 |
| 0.769 | 0.361 | 0.324 |
| 0.722 | 0.407 | 0.574 |
| 0.685 | 0.120 | 0.389 |
| 0.704 | 0.380 | 0.176 |
| 0.713 | 0.528 | 0.333 |
| 0.694 | 0.556 | 0.213 |
| 0.704 | 0.093 | 0.176 |
| 0.704 | 0.139 | 0.333 |
| 0.731 | 0.213 | 0.139 |
| 0.713 | 0.231 | 0.463 |
| 0.713 | 0.259 | 0.130 |
| 0.731 | 0.176 | 0.194 |
| 0.731 | 0.583 | 0.407 |
| 0.694 | 0.324 | 0.120 |
| 0.731 | 0.250 | 0.296 |
| 0.731 | 0.537 | 0.380 |
| 0.731 | 0.472 | 0.315 |
| 0.741 | 0.222 | 0.528 |
| 0.694 | 0.463 | 0.630 |
| 0.704 | 0.352 | 0.667 |
| 0.704 | 0.352 | 0.463 |
| 0.722 | 0.093 | 0.435 |

-continued

| | Measured Fiber Length in cm | | |
|---|---|---|---|
| | Unprocessed Fiber | Process Via U.S. Pat. No. 4,163,742 | Preconsolidation Process |
| | 0.694 | 0.269 | 0.574 |
| | 0.722 | 0.259 | 0.389 |
| | 0.685 | 0.139 | 0.602 |
| | 0.694 | 0.102 | 0.759 |
| | 0.722 | 0.259 | 0.685 |
| | 0.722 | 0.343 | 0.537 |
| Avg. | 0.713 | 0.305 | 0.408 |

What is claimed is:

1. A process for preconsolidating a porous thermoplastic resin-fiber planar layer comprising: heating said preform layer to above the melt temperature of the thermoplastic resin; applying sufficient pressure normal to the plane of the layer while the layer is unconstrained in the in-plane directions to cause the molten resin to flow; orienting said fibers in substantially the plane of the layer by means of said flow to form a preconsolidated sheet; and cooling said sheet under pressure.

2. The process of claim 1 wherein said thermoplastic resin is a fluoropolymer and said fibers are carbon.

3. The process of claims 1 or 2 including forming a solid shaped composite from a stack of said sheets by heating said stack to a high enough temperature and applying sufficient pressure for a sufficient amount of time to form said solid shaped composite.

* * * * *